United States Patent [19]

Hames et al.

[11] Patent Number: 4,661,729

[45] Date of Patent: Apr. 28, 1987

[54] VOICE COIL MOTOR MAGNET ASSEMBLY

[75] Inventors: Jeffrey L. Hames, Rochester, Minn.; Charles M. Lacey, Petersfield, United Kingdom; Ronald R. Neuman; John R. Reidenbach, both of Rochester, Minn.

[73] Assignee: International Business Machines Corporation, Armonk, N.Y.

[21] Appl. No.: 827,125

[22] Filed: Feb. 3, 1986

[51] Int. Cl.$^4$ .............................................. H02K 41/02
[52] U.S. Cl. ......................................... 310/13; 310/12; 310/154; 310/89
[58] Field of Search ................. 310/12, 13, 14, 15, 310/17, 27, 46, 154, 89; 360/97, 99, 106; 179/119, 120

[56] References Cited

U.S. PATENT DOCUMENTS

| 3,666,977 | 5/1972 | Helms et al. | 310/13 |
|---|---|---|---|
| 3,681,630 | 8/1972 | Sutton | 310/13 |
| 4,155,021 | 5/1979 | Corbach et al. | 310/154 |
| 4,305,105 | 12/1981 | Ho et al. | 310/12 |
| 4,372,035 | 2/1983 | McMillen | 310/154 |
| 4,439,699 | 3/1984 | Brende et al. | 310/13 |
| 4,465,946 | 8/1984 | Springer | 310/89 |
| 4,528,466 | 7/1985 | von der Heide et al. | 310/13 |

OTHER PUBLICATIONS

Boyd, III et al, "Linear Electric Motor", IBM Tech. Disc. Bull., vol. 15, No. 3, Aug. 1972, pp. 1023-1024.
Rusch et al, "Permanent Magnets in Stator of Moving-Coil Linear Actuator", IBM Tech. Disc. Bull., vol. 19, No. 5, Oct. 1976, pp. 1837-1839.

Primary Examiner—Patrick R. Salce
Assistant Examiner—D. L. Rebsch
Attorney, Agent, or Firm—Robert W. Lahtinen

[57] ABSTRACT

A voice coil motor for a moving storage media actuator has a permanent magnet assembly wherein a radially polarized magnet is formed as sectors, with like sectors of the outer housing which forms a portion of the pole piece assembly. These sectors are then mounted on the remainder of the pole piece assembly for the magnetic actuator to form a cylindrical magnet and cylindrical outer pole piece. The sectors require no further attachment or adhesive in addition to the magnetic field and provides substantially zero clearance contact between magnet and pole piece, to afford a continuous magnetic path interrupted only by the working gap through which the voice coil travels.

3 Claims, 5 Drawing Figures

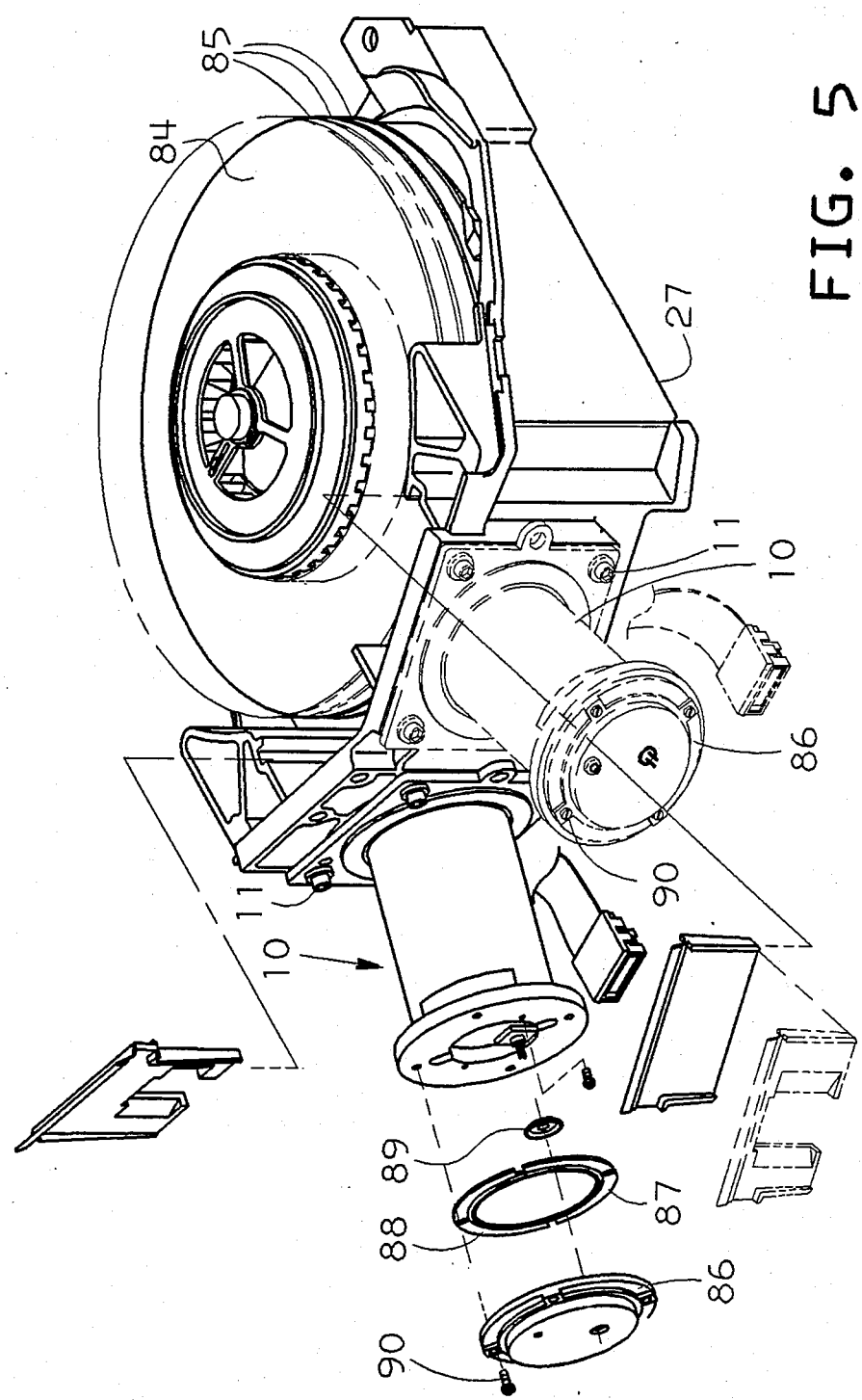

VOICE COIL MOTOR MAGNET ASSEMBLY

BACKGROUND OF THE INVENTION

This invention pertains to actuators for moving storage devices and more particularly to a magnet assembly for voice coil motor driven actuators for such devices.

Higher performance is continuously demanded of rigid magnetic disk drive actuators for quicker access, which requires stronger flux fields to increase the drive of the voice coil motor. This can be accomplished by a high continuous, uninterrupted high permeability flux path from one side of the working gap to the other, and strong permanent magnets. Not only are larger or stronger magnets required, but also form factor limitations imposed by standard overall dimensions that limit the space available and demand a compact structure must be accommodated.

Stronger fields make shielding even more important to keep stray fields from the disk surface areas or locations where interference with other components may occur. Stronger permanent magnetic materials makes progressively more difficult the fabrication technologies that require a magnet and core to be axially assembled with minimum or zero clearance therebetween.

SUMMARY OF THE INVENTION

In the magnet structure of the present invention, segments that form a cylindrical outer core are bonded to magnetic segments to form segment assemblies that cooperate, when assembled to an actuator inner core assembly, to form an annular outer core and a radially polarized cylindrical magnet with zero clearance, except for the bonding material, between outer core and magnet. Eliminating clearance at this location affords a continuous path for the magnetic flux with the only interruption occurring in the working gap of the voice coil motor to maximize the usefulness of the flux field in the device.

The segments of outer core and magnet elements are assembled to the balance of the core assembly. The strong permanent magnet causes sufficient attraction between the outer core segments and the core elements in intimate contact at each axial end to preclude the necessity for bolts or other securing means. With the strong permanent magnets now being used in such applications, the removal of the segments from the assembled condition is accomplished with difficulty.

The simple assembly of outer core and magnet segments to the balance of the core assembly can be easily accomplished without a fixture. The segments are placed in position and retained solely by magnetic attraction. As the segments approach the other core elements, magnetic attraction increases. Although removed with difficulty, the segments can be moved axially to the final abutting position with the balance of the core assembly or rotated in the attached condition to a desired assembled position with relative ease.

The magnet-outer pole piece structure that is split into a plurality of segment assemblies, these assemblies forming a cylindrical enclosure about the inner core as shown and described, enables future performance enhancements with high-energy magnets. This would not be possible using prior one piece housings because of access restraints associated with the magnetization process. The structure shown reduces the complexity and cycle times of the magnetization process. Only a relatively simple coil is required without iron cores and associated ejection problems which avoids concerns related to the damage of magnets and magnet coatings.

BRIEF DESCRIPTION OF THE DRAWING

FIG. 5 is a perspective view similar to FIG. 4 with the device cover removed to show the disk assembly.

DETAILED DESCRIPTION

Figure 1:
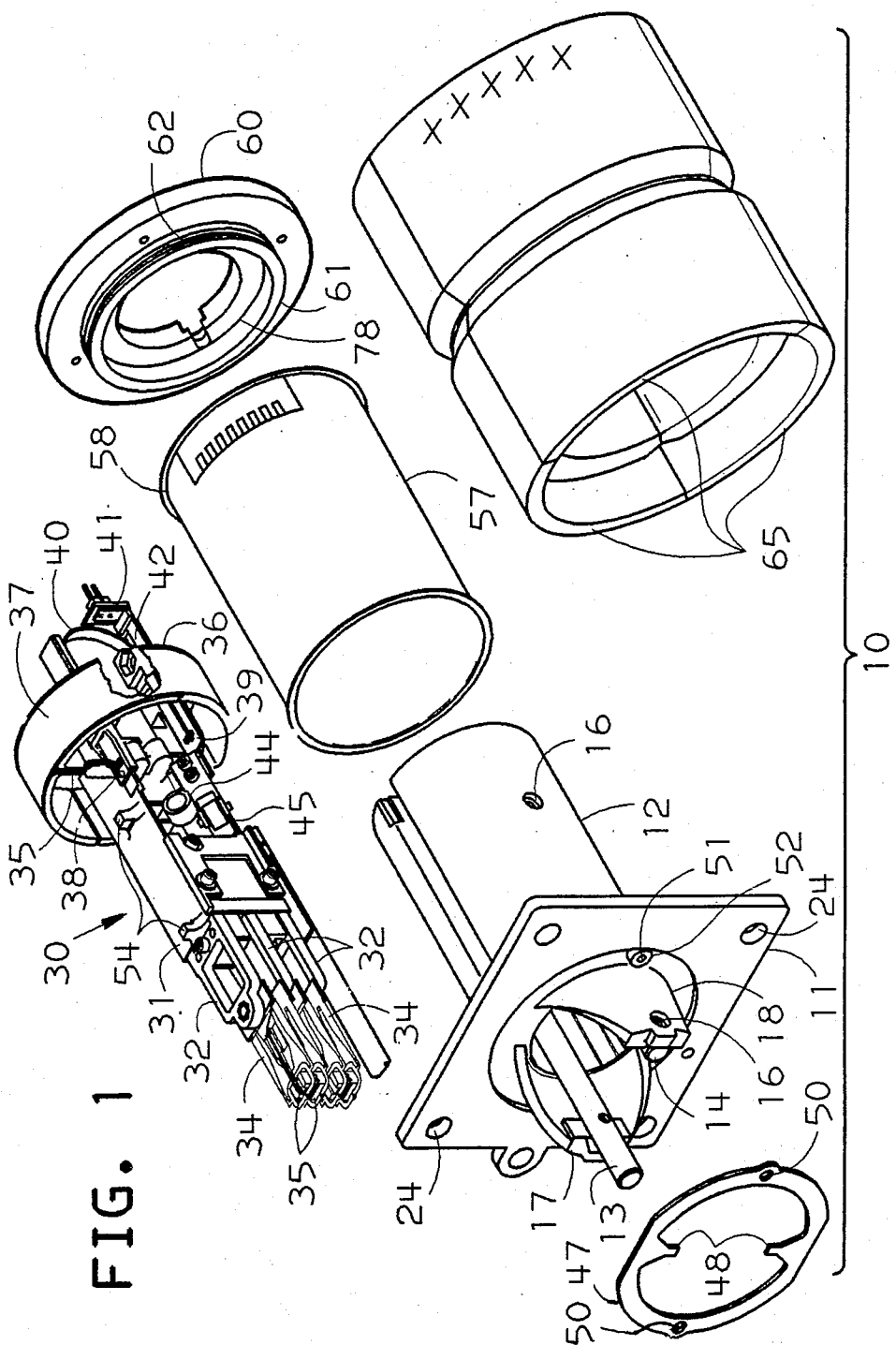
FIG. 1 is an exploded perspective view of a linear actuator for a disk drive which incorporates the present invention and includes the voice coil motor, carriage, heads and suspensions therefor, and crash stop.
Figure 4:
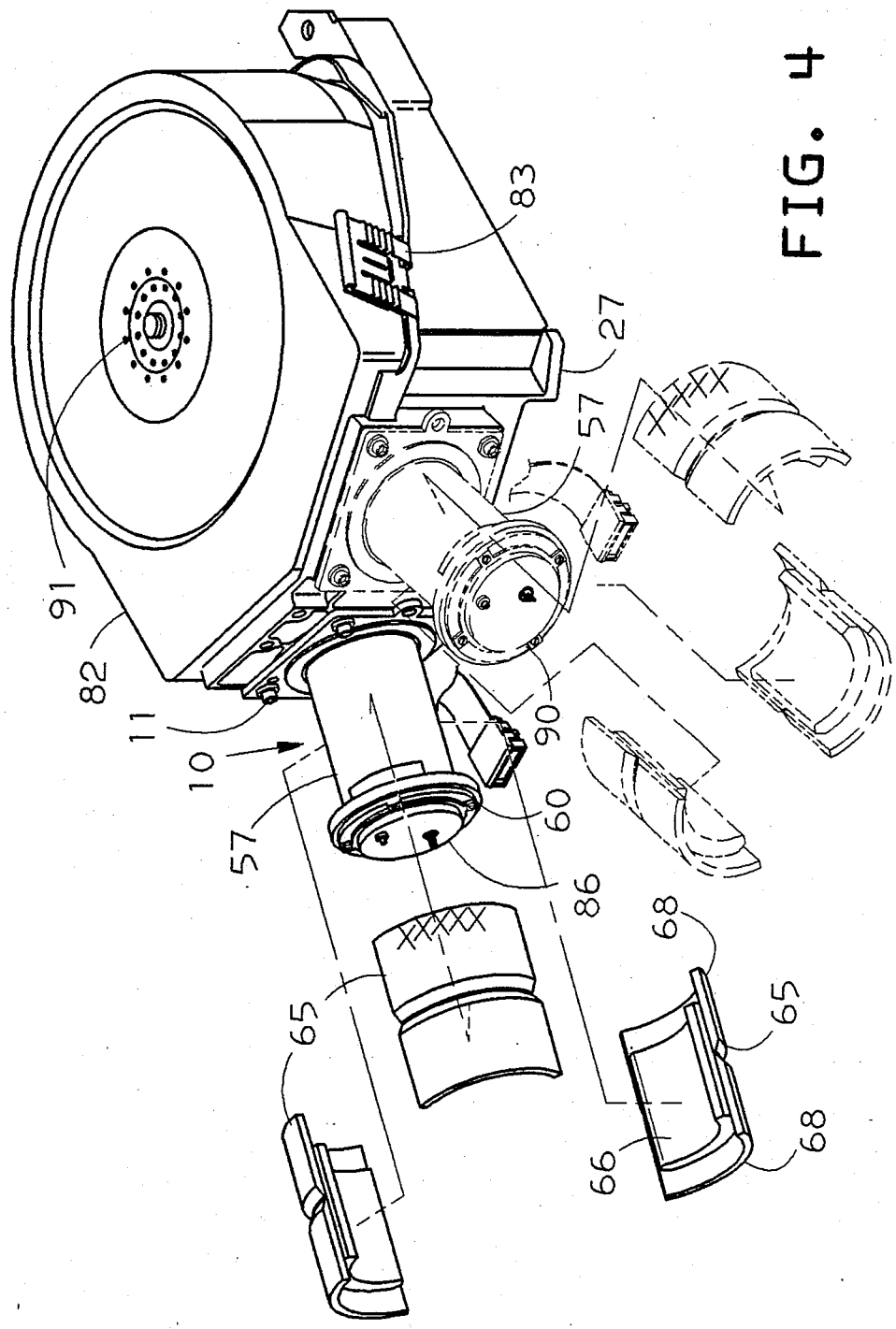
FIG. 4 is a perspective view of a disk drive assembly which carries two of the actuators of FIG. 1, partly in exploded view and partly in phantom view.

In the showing of FIG. 1, the various elements of the actuator assembly 10 are illustrated in an exploded view. The flange 11 and split cylinder inner core piece 12 are formed as a single part. The ways 13, 14 are attached to the respective sides of the inner core piece and the integrally cast projections 17, 18 by bolts 16 which have the heads recessed. The way 13 engages the core piece 12 and extension 17 at grooved raised mounting pads 19, 20 (FIG. 2) that are cast as an integral part of the inner core, with holes 21, 22 bored therethrough to receive the mounting bolts 16. The openings 24 in flange 11 receive the bolts which mount the actuator assembly to a disk drive base casting 27 (FIG. 4).

The carriage assembly 30 includes a body 31 to which a series of three arms 32 are secured. The upper and lower arms carry a single suspension 34 on which is mounted a slider 35 that carries the magnetic transducer. The intermediate arm extends between a pair of disks and carries two suspensions to enable heads to be flown adjacent each of the confronting data surfaces. The carriage body 30 has projections 35 which extend to and support the bobbin 36 about which the voice coil 37 is wound. The voice coil windings 37 are terminated at the terminal pad 38 adjoining the base of the upper projection 35 and connected to a flexible conductor 39. The flexible conductor arcuate portion 40 connects to the voice coil wire terminations at terminal pad 38 and is secured to the bracket 42 carried by the core assembly 12 and at the other end terminates at plug 41. The plug 41 receives the connector (not shown) through which the electrical signals or pulses are transmitted to the voice coil windings 37.

The carriage 30 is mounted for reciprocating motion in the actuator by three pairs of rollers which engage the ways 13, 14. Two longitudinally spaced pairs (not visible) of fixed canted rollers engage the cylindrical way 13 and one pair of canted rollers 44, 45 engage the way 14. The roller pair 44, 45 is mounted on the carriage 30 longitudinally intermediate the roller pairs engaging way 13. Roller 44 is fixed while roller 45 is pivotable and biased toward roller 44 so that any play or slack in the mounting system between the ways 13, 14 and carriage 30 is removed.

A crash stop 47 is mounted to the core assembly 12 by bolts which pass through openings 50 and are received in the threaded bores 51 formed in bosses 52. The crash stop is formed of resilient sheet material and presents a pair of projections 48. The carriage body 31 includes a pair of projections 54 (and a similar pair on the bottom which are not visible). In the assembled condition of the actuator, the crash stop projection 48 extends between the carriage projections 54 to limit carriage travel in each direction of reciprocation.

The cylindrical sleeve 57 with end flanges 58 is formed of non-magnetic conductive material that functions as a shorted turn in the assembled condition. The collar 60 has a cylindrical projection 61 with a groove 62 formed therein for receiving an O-ring seal 63 (FIG. 2).

The segments 65 form the radially magnetized permanent magnet and backing plate assembly. Each segment 65 encloses 120 degrees about the inner core assembly such that three segments wholly surround the assembly 12, voice coil 37 and air gap 74 of the voice coil motor. The magnet material is formed as a segment 66 as shown in FIG. 3 and the backing plate portion of the segment 65 is formed of two identical parts 68 turned end for end, that the champfered surfaces 69 axially adjoin. Using an appropriate fixture, the outer core pieces 68 are retained in axially spaced relation and the outer convex surface 70 of the magnet element 66 is bonded to the inner concave surfaces 71 of the backing plate elements 68. It will be noted from FIG. 2 that the magnet 66 is secured to the backing plate core elements 68 nearer one end 72 which is assembled in abutting relation to flange 11.

After the backing plate-magnet segment assembly 65 is formed, the magnet 66 is energized to become a radially polarized permanent magnet. The chamfered surfaces 69 and the axial spacing between the elements 68 of outer core segments 65 are provided to establish a reluctance gap that serves to more equally divide the flux that flows through each axial end of the core assembly to create a uniform magnetic field along the working length of the air gap 74 within which the voice coil 37 reciprocates.

Figure 2:
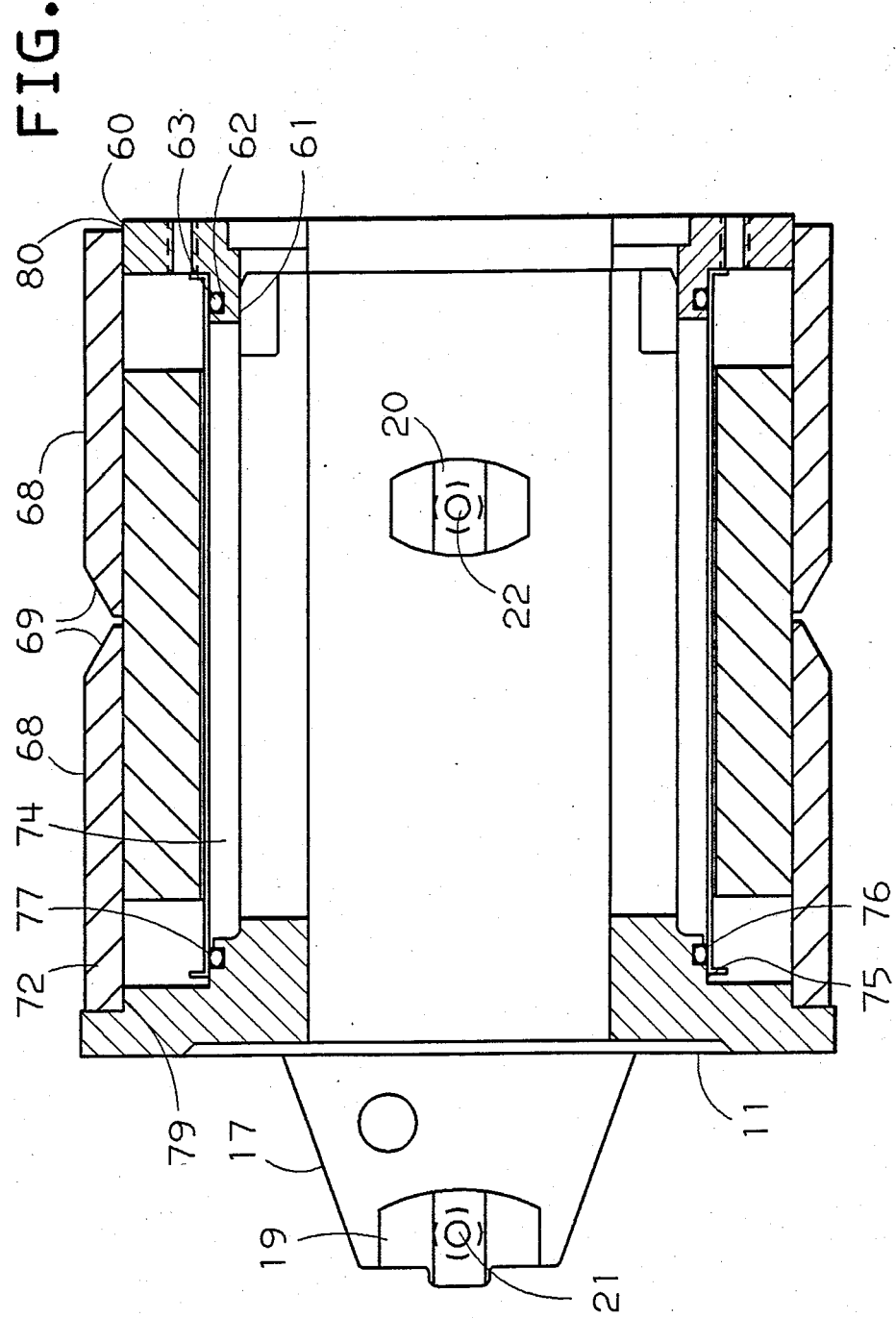
FIG. 2 is a vertical axial section of the core elements, shorted turn and magnet segments of the actuator of FIG. 1.
Figure 3:
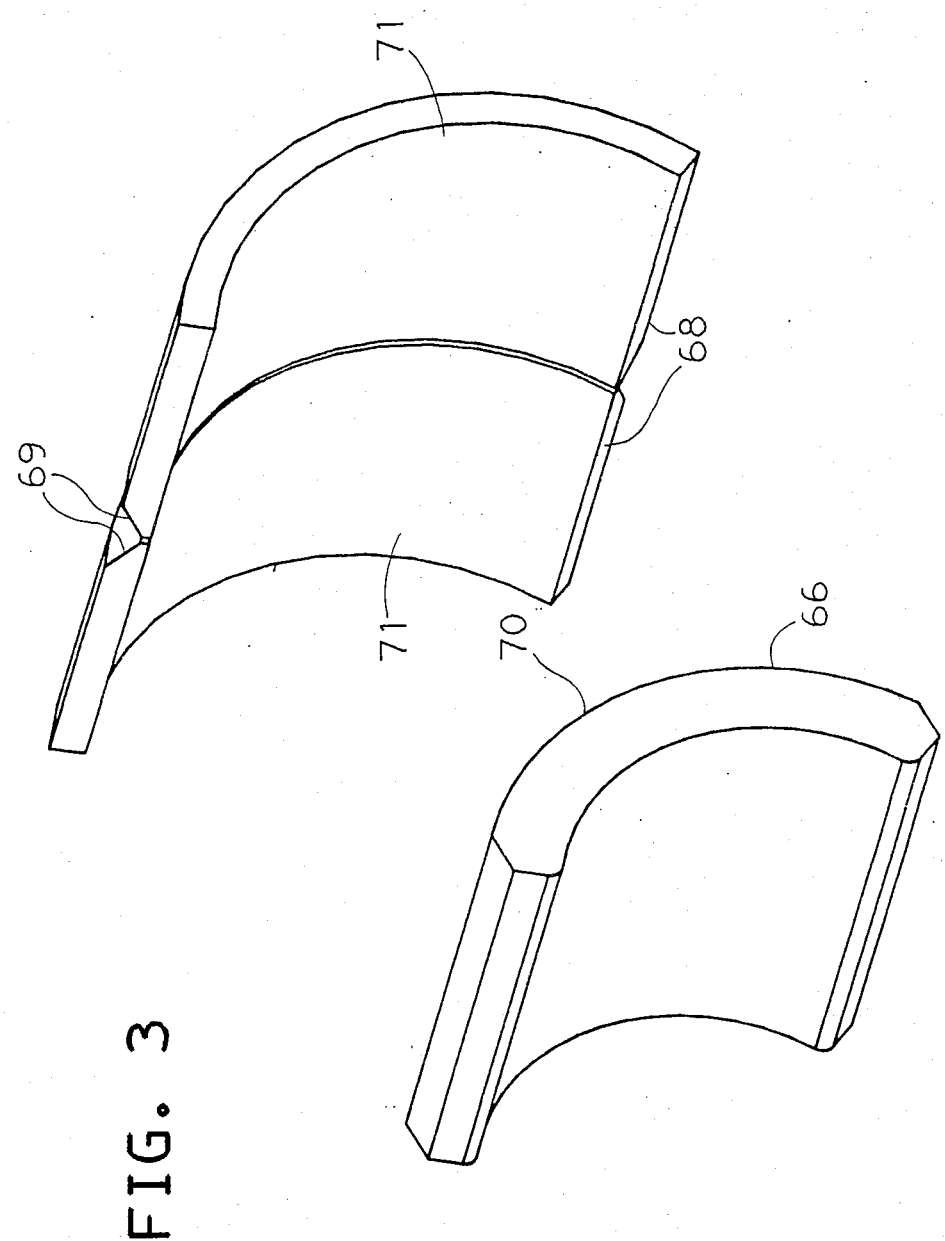
FIG. 3 is an exploded view of the magnet and backing plates that form the magnet assembly segments of the actuator of FIG. 1.

FIG. 2 shows an axial section view of the inner core 12, outer core segments 65, collar 60 and shorted turn 57. The inner core has a shoulder 75 extending from mounting flange 11 with a groove 76. The shorted turn 57 is slipped over the cylindrical surface of shoulder 75 and a sealed relationship is assured by an O-ring 77 in groove 76. The collar cylindrical inner surface 78 of projection or flange 61 is received over the distal outer axial surfaces of the halves of inner core 12 and the outer surface of flange 61 is received within the end of shorted turn 57. A seal is assured by the O-ring 63 disposed in groove 62.

The backing plate-magnet segments 65 are assembled by placing the shorter projecting core segment end 72 on the flange 11 shoulder surface 79 and the opposite outer core segment inner end surface confronting the collar outer peripheral surface 80. The outer core segments 65 can be adjusted axially to an abutting relation between segment axial end surface and the confronting surface of flange 11 and rotated where necessary with relative ease. However, the strong magnet makes removal from the flange surface 79 and collar surface 80 very difficult. The magnetic attraction is of such strength that no further means of securement is required to firmly attach the segments 65 to the other elements of the magnet and core assembly.

It will also be observed that the outer core segments 65 are assembled with very little clearance between the shorted turn 57 and the permanent magnets 66. The close tolerance which enables all the clearance between elements of the magnetic flux path to be contained in the working air gap 74 in which the voice coil 37 is positioned in the assembled condition. This close tolerance is enabled by the segment form of the magnet and outer core and would not be attainable if it were necessary to insert a strong cylindrical magnet or segments thereof axially within a cylindrical outer core.

FIG. 4 shows a disk file with a base casting or frame 27 and cover 82 forming a disk enclosure. The cover 82 and frame 27 are secured together by a series of clips 83. A pair of actuators 10 are mounted on the base member 27 with carriage portions projecting through apertures to enable the transducer heads 35 to confront the data surfaces 84 of disks 85 mounted therein. As seen in FIG. 5, the disk enclosure contains four magnetic disks. The actuator 10 at the left in FIGS. 4 and 5 accesses the data surfaces of the lower two disks, while the actuator at the right in these two figures accesses the data surfaces of the upper two disks.

In addition to the elements shown in FIGS. 1 and 2, the actuator 10 further includes a voice coil motor housing cap 86 and a voice coil motor housing cap seal 87. The gasket 89 includes an aperture through which the plug 41 extends and is sealed against the cap 86. The cap 86 is secured to collar 60 by a series of four end cap mounting screws 90 and in cooperation with the inner core assembly 12, shorted turn 57 and collar 60 seal the actuator. As seen in FIG. 4, cover 82, frame 27 and actuators 10 (with the magnetic segments 65 removed or not yet assembled) form a substantially sealed head-disk enclosure that is isolated from the surrounding atmosphere except for the cover openings 91 that communicate with the enclosed volume through a breather filter. The breather filter is provided to accommodate changes in pressure and expansion and contraction of the air within the head-disk enclosure caused by temperature changes. This structure enables the disk drive to be assembled in a clean room environment to the phase of assembly wherein the head-disk assembly is completely enclosed and sealed such that any air entering must pass though the openings 91 and the associated breather filter without the magnet assembly segments 65 being present. After the head-disk assembly has been assembled to enclose the disk and transducer carriage assemblies, the unit can be removed from the clean room and the permanent magnet assemblies attached to complete the actuator fabrication. This sequence of assembly and device structure permits the exclusion of the permanent magnets from the clean room assembly area. The permanent magnets are also outside and isolated from the head disk enclosure space. It is thus not possible for particles released from the magnets to be in the disk enclosure. Such particles would not only be likely to cause head crashes as the height of the particle exceeds the fly height of the head above the disk surface, but also precludes the possibility that such particles would erase or alter the data on the disk surfaces causing non-recoverable hard errors. Particles emanating from the permanent magnets cause catastrophic results, since these are very strong permanent magnet materials in contrast to the magnetic domains on the disk which are small weaker magnets that permit relatively easy alteration.

While the invention has been particularly shown and described with reference to a preferred embodiment, it will be understood by those skilled in the art that various changes in form and details may be made therein without departing from the spirit and scope of the invention.

What is claimed is:

1. A magnet assembly subtending an arc small enough to permit radial installation of said assembly on a linear voice coil motor comprising
    a pair of arcuate pole portions of magnetically permeable material which have concave inner surfaces, are axially aligned, formed as cylindrical sectors and have a continuous axial separation therebetween;
    a radially polarized magnet element formed as a cylindrical sector having a convex outer surface with substantially the same radius as the inner surface of said pole portions; and
    bonding means for securing said convex magnet surface to said pole portion concave inner surfaces, whereby the axial separation between said arcuate pole portions forms a reluctance gap therebetween.

2. A magnet assembly subtending an arc small enough to permit radial installation of said assembly on a linear voice coil motor comprising
    a pair of axially aligned arcuate pole portions of magnetically permeable material formed as cylindrical sectors and having concave inner surfaces;
    a radially polarized arcuate magnet formed as a cylindrical sector having a convex outer surface with substantially the same radius as the concave inner surfaces of said pole portions; and
    bonding means for securing said convex magnet surface to said pole portion concave inner surfaces with said pole portions extending beyond said magnet element in each axial direction and with said pole portions and said magnet being coextensive in the arcuate direction;
    said magnet assembly subtending an arc such that a plurality of such assemblies form a continuous, substantially cylindrical outer core and radially polarized magnet unit.

3. The magnet assembly of claim 1 wherein said pair of pole portions are arcuately chamfered at the outer surface along the arcuate confronting surfaces to reduce the confronting surface areas between the pole portions at said reluctance gap.

* * * * *